No. 725,295. PATENTED APR. 14, 1903.
H. C. STRÄNG.
GAS ENGINE.
APPLICATION FILED JULY 10, 1899.
NO MODEL. 6 SHEETS—SHEET 2.
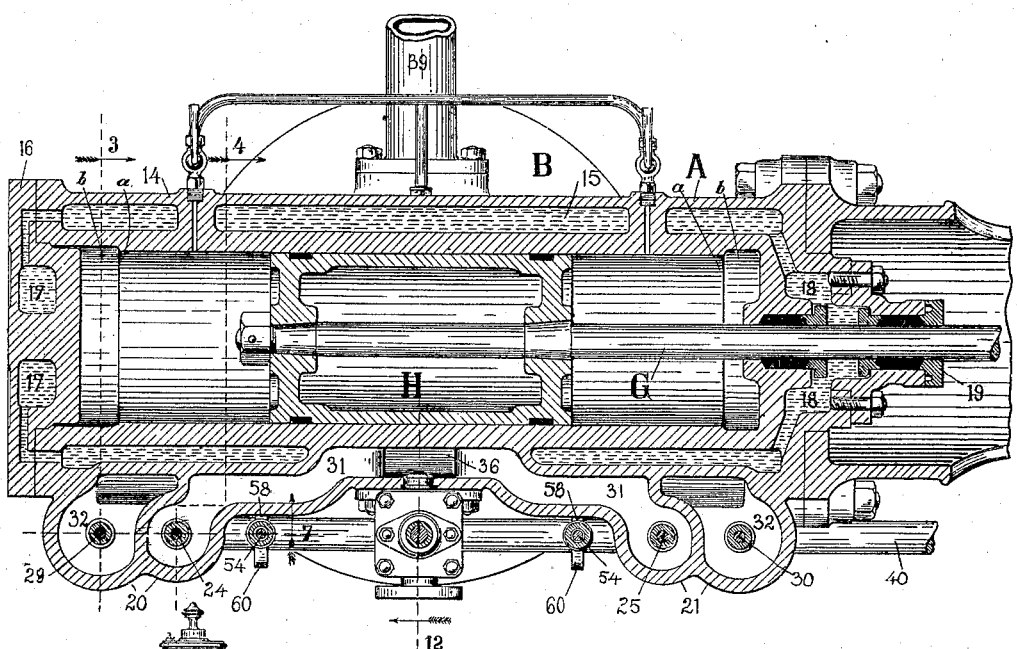
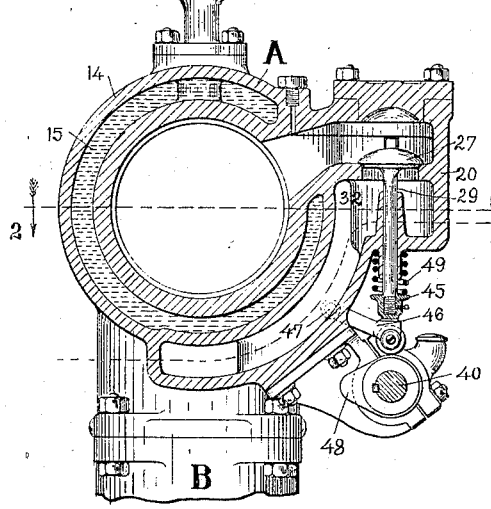
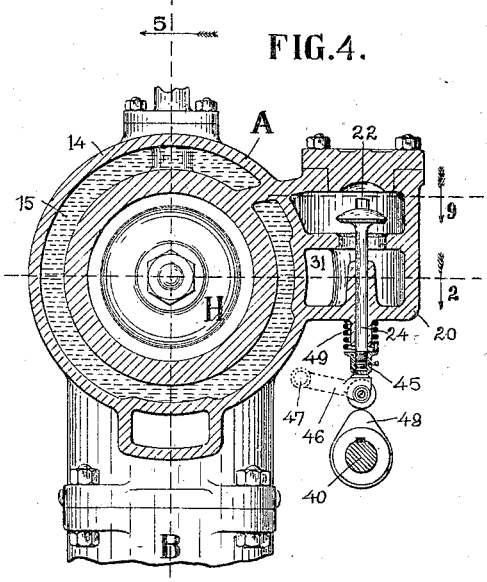
Witnesses:
L. M. Freeman
A. E. Lehmann
Inventor:
H. C. Sträng.
By G. B. Coupland & Co.
attys.

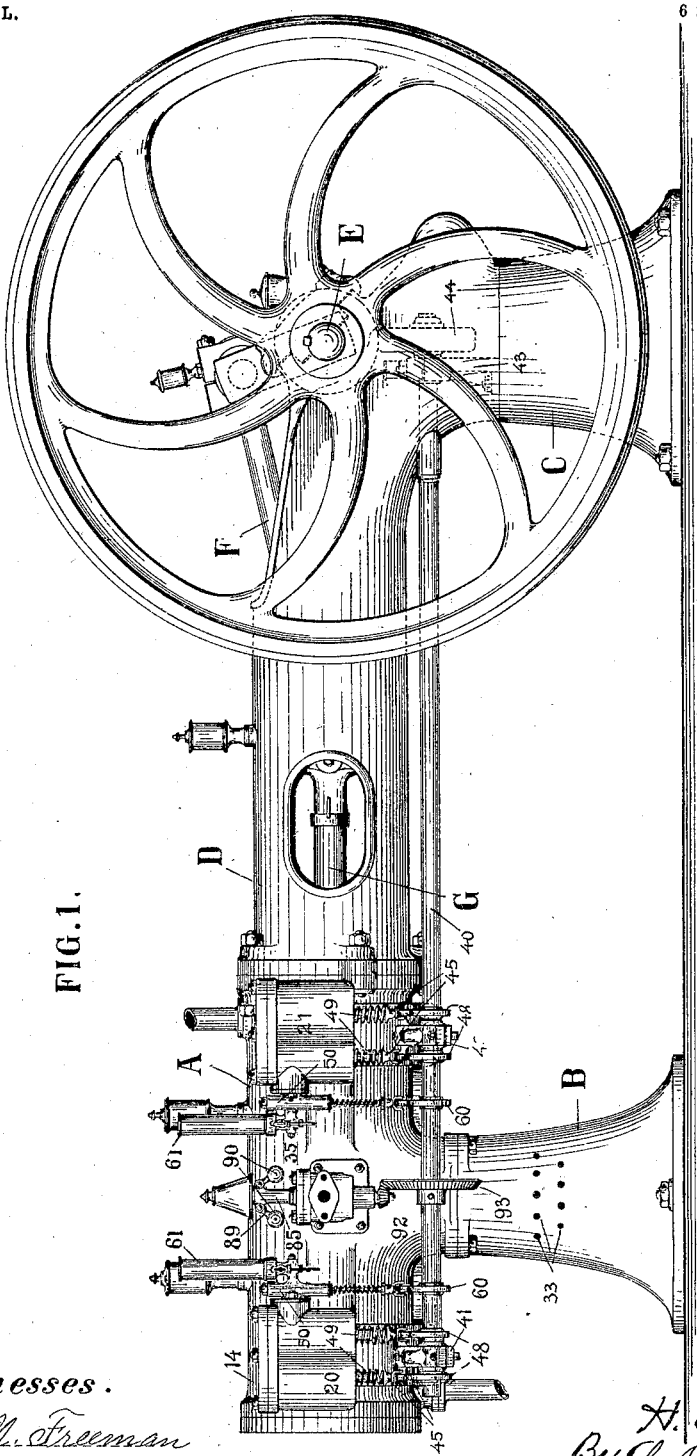

No. 725,295. PATENTED APR. 14, 1903.
H. C. STRÄNG.
GAS ENGINE.
APPLICATION FILED JULY 10, 1899.
NO MODEL. 6 SHEETS—SHEET 5.
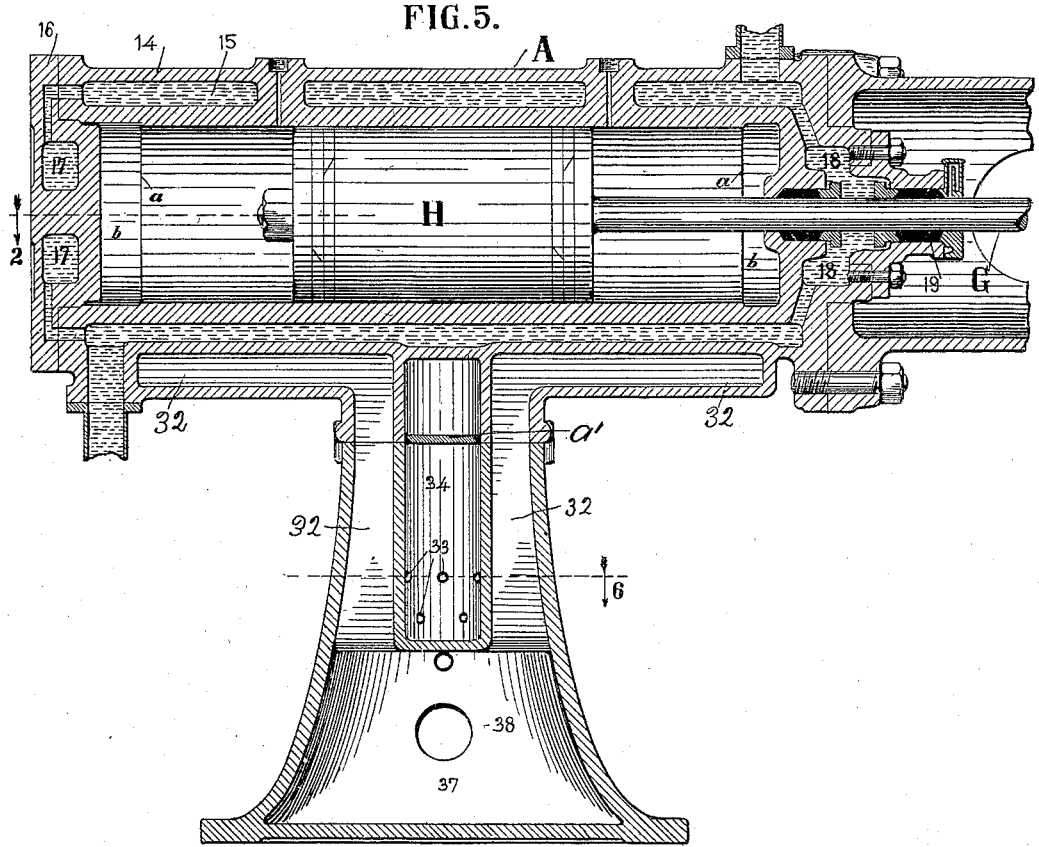
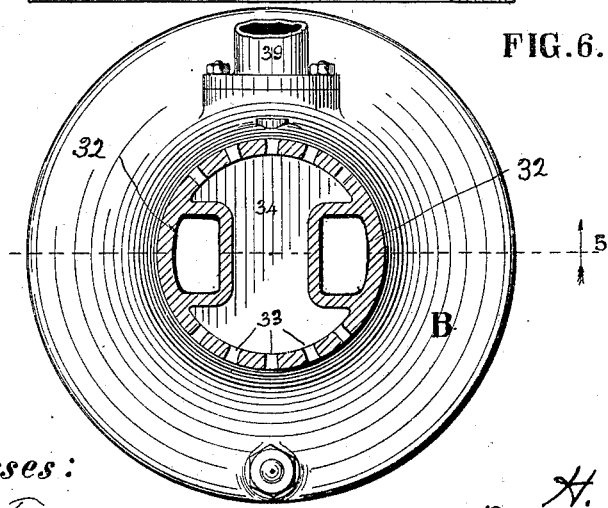
Witnesses:
L. M. Freeman.
B. Lehmann
Inventor
H. C. Sträng.
By L. B. Coupland & Co.
attys.

No. 725,295. PATENTED APR. 14, 1903.
H. C. STRÄNG.
GAS ENGINE.
APPLICATION FILED JULY 10, 1899.
NO MODEL. 6 SHEETS—SHEET 4.

Witnesses:
L. M. Freeman
A. C. Lehmann

Inventor
H. C. Sträng.
By L. B. Coupland
attys.

No. 725,295. PATENTED APR. 14, 1903.
H. C. STRÄNG.
GAS ENGINE.
APPLICATION FILED JULY 10, 1899.
NO MODEL. 6 SHEETS—SHEET 5.
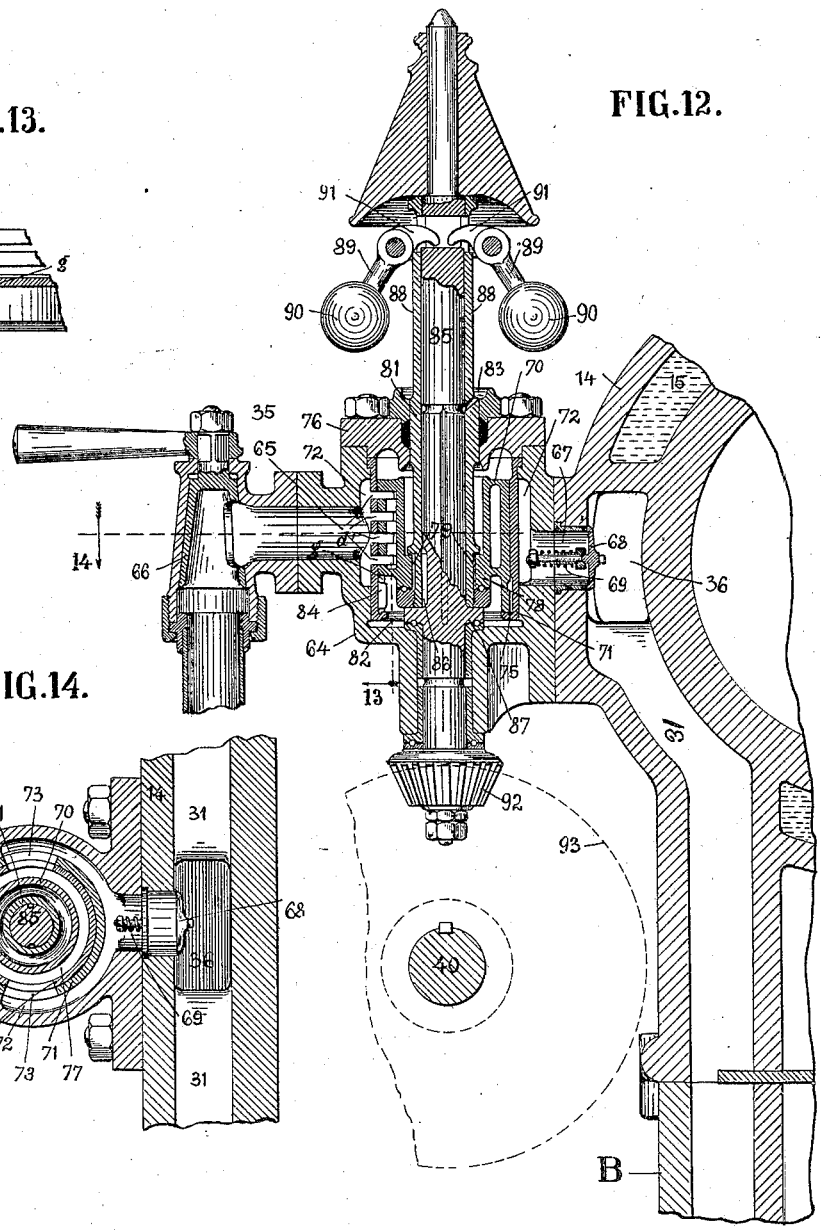
FIG. 13.
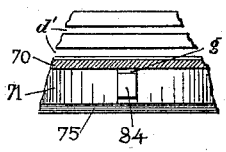
FIG. 12.
FIG. 14.
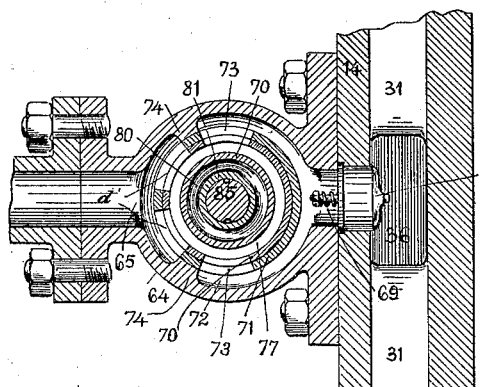
Witnesses:
L. M. Trueman.
A. E. Lehmann.
Inventor:
H. C. Sträng.
By L. B. Coupland & Co.
attys.

No. 725,295. PATENTED APR. 14, 1903.
H. C. STRÄNG.
GAS ENGINE.
APPLICATION FILED JULY 10, 1899.
NO MODEL. 6 SHEETS—SHEET 6.

Witnesses:
L. M. Freeman
A. E. Lehmann

Inventor:
H. C. Sträng.
By L. B. Coupland & Co.
attys.

UNITED STATES PATENT OFFICE.

HENRIK C. STRÄNG, OF CHICAGO, ILLINOIS.

GAS-ENGINE.

SPECIFICATION forming part of Letters Patent No. 725,295, dated April 14, 1903.

Application filed July 10, 1899. Serial No. 723,332. (No model.)

*To all whom it may concern:*

Be it known that I, HENRIK C. STRÄNG, a citizen of the United States, residing at Chicago, in the county of Cook and State of Illinois, have invented certain new and useful Improvements in Gas-Engines; and I do hereby declare the following to be a full, clear, and exact description of the invention, such as will enable others skilled in the art to which it appertains to make and use the same.

This invention relates to improvements in gas-engines of the double-acting type, and has for its object, among others, the construction of an engine of this class which shall combine the characteristic features of simplicity and durability and be very economical in operation.

Another object is to provide an engine that is not liable to get out of order, easily cared for, and not subject to fluctuations during the time that it is working.

Another object is to provide a simple and convenient arrangement of valves and governing devices for automatically regulating the strength of the explosions in the cylinder in accordance with the load or demand made on the engine, thus greatly assisting in maintaining a uniform action under all conditions, the volume of gas used being proportionate to the actual amount of work done, which is a very desirable and important feature in this class of engines.

Other objects are to provide means for keeping the cylinder and piston cool when using very high explosive mixtures as a motive agent and the use of means in rendering the running of the engine comparatively noiseless.

Figure 8:
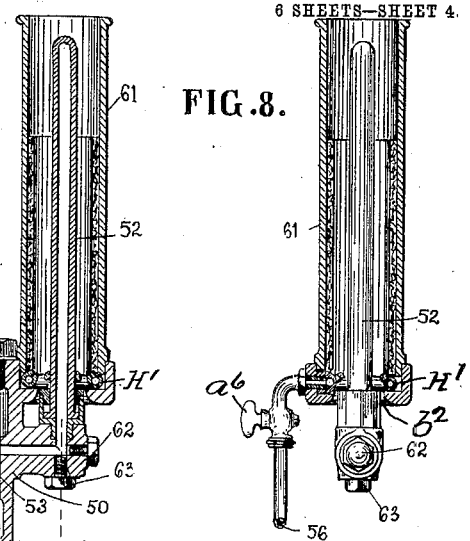
Figure 7:
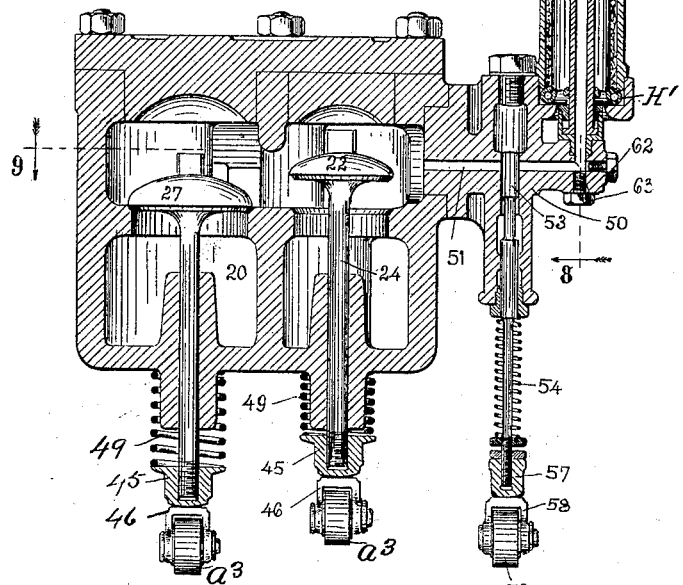
Figure 10:
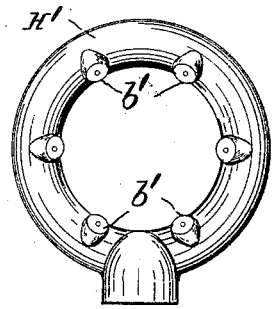
Figure 9:
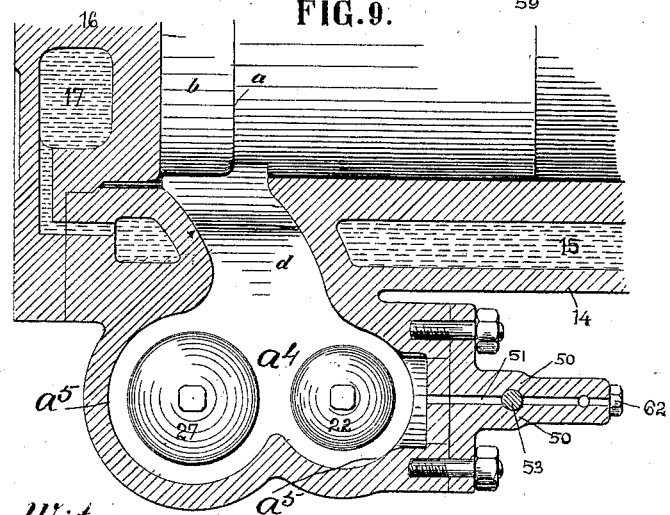
Figure 11:
Figure 15:
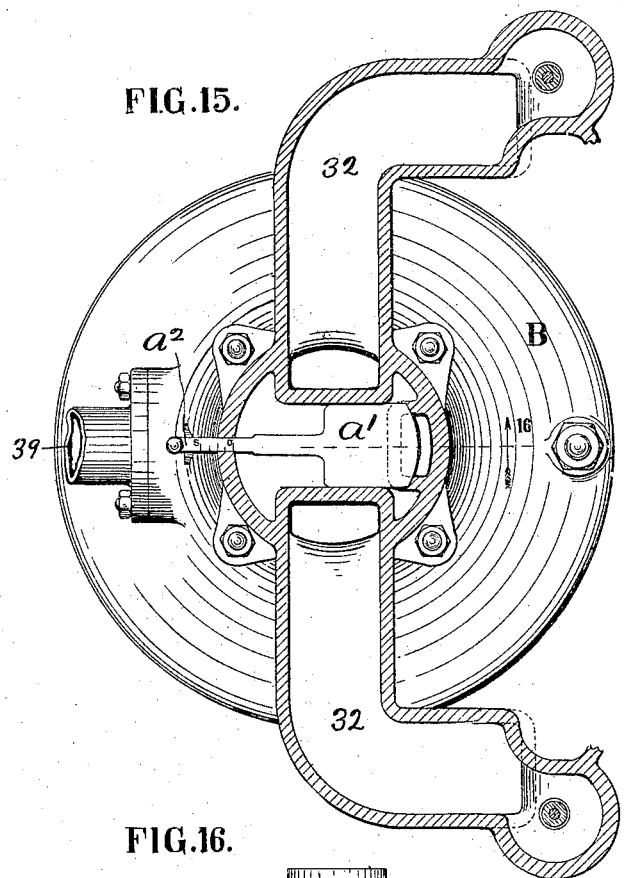
Figure 16:
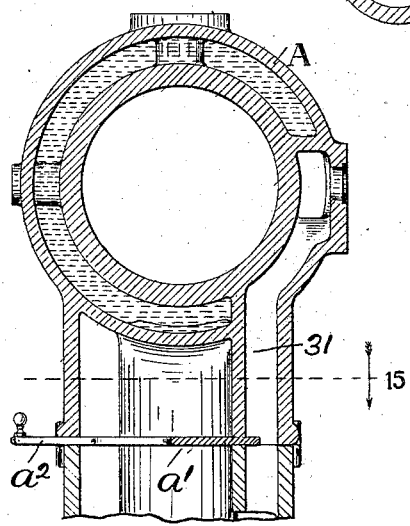

In the accompanying drawings, Figure 1 is a side elevation of an engine embodying the improvements. Fig. 2 is a horizontal broken-away section of the cylinder end on line 2, Figs. 3 and 4, looking in the direction indicated by the arrow. Fig. 3 is a transverse section on line 3, Fig. 2. Fig. 4 is a transverse section on line 4, Fig. 3. Fig. 5 is a broken-away vertical longitudinal section on line 5, Fig. 4, and line 5, Fig. 6. Fig. 6 is a horizontal section on line 6, Fig. 5. Fig. 7 is a broken-away section on line 7, Fig. 2. Fig. 8 is a section on line 8, Fig. 7. Fig. 9 is a broken-away horizontal section on line 9, Figs. 4 and 7. Fig. 10 is a detached plan of a burner used in the igniting-tubes. Fig. 11 is a transverse section of the same. Fig. 12 is a section on line 12, Fig. 2, showing the governing apparatus in its relative working position. Fig. 13 is a section on line 13, Fig. 12. Fig. 14 is a horizontal section on line 14, Fig. 12. Fig. 15 is a section on line 15, Figs. 3 and 4; and Fig. 16 is a vertical section on line 16, Fig. 15.

The cylinder A is mounted on a pedestal or stool B and connects with the front pedestal C by a supporting guide-frame D, which is of the usual construction.

E is the crank-shank, provided with suitable journal-bearings in the supporting-frame; F, the connecting-rod; G, the piston-rod, and H the piston.

The cylinder is provided with the usual inclosing jacket 14, between which and the cylinder is the water-space 15. The outer end of the cylinder is closed by a head 16, provided with the water-chamber 17, the opposite head end being cast integral therewith and is provided with water-chamber 18, the water-chambers in the respective ends of the cylinder communicating with the jacketed water-space of the cylinder in maintaining a continuous cooling circulation around the piston-rod. The stuffing-box 19 is bolted to the solid end of the cylinder, as shown in Fig. 2. Adjacent to each end of the cylinder and on the same side thereof are located valve-chests 20 and 21, in the chambers of which are located the companion gas and air valves. But one of these valves 22 is shown, the companion valve occupying the same position in the valve-chest 21. These valves are respectively mounted on stems 24 and 25. One of the exhaust-valves 27 is mounted on stem 29 and the companion exhaust-valve on stem 30, the relative position of the supply and exhaust valves being shown in Figs. 2, 7, and 9. Each pair of valves—that is, the air and exhaust valve in each valve-chest—has a common contracted port or passage $d$, opening into the space $b$ in the respective ends of the cylinder. The induction-passages 31 lead to the respective air and gas valves at each end of the cylinder. 32 represents the exhaust-passages. The air and gas valves will be hereinafter referred to as "air-valves."

The volume of air required for the explosive mixture is drawn in through a number of apertures 33, Figs. 1, 5, and 6, in the pedestal or stool B and enters a chamber 34, with which the induction-passage 31 communicates. The gas-supply is admitted through the governor supply-valve 35. The volume of air admitted is controlled and proportioned by means of a valve $a'$, Figs. 5, 15, and 16, inserted in the stool B. This valve is provided with the projecting handle $a^2$, whereby the same may be adjusted by hand in increasing or diminishing the area of the passage at the point where the valve is located.

The air entering from the chamber 34 in the pedestal and the incoming proportionate supply of gas commingle in the mixing-chamber 36, Figs. 2 and 12, from which point the mixed volume of air and gas flows through the passages 31, leading to the respective air-valves at each end of the cylinder. By this arrangement the air and gas are taken in on the same side of the cylinder and having some distance to travel together the mixture becomes of a thoroughly homogeneous character by the time the valves controlling the admission to the cylinder are reached.

The exhaust-passage 32 leads down under the cylinder at each end, Figs. 3, 5, and 6, and exhausts into chamber 37 in the base of the stool-pedestal and escapes into the atmosphere through apertures 38 and exhaust-pipe 39.

A valve-actuating cam-shaft 40 is located underneath the valve-chests and the different valves, Figs. 1, 2, 3, and 4, and is provided with journal-bearings in brackets 41 and 42, bolted to the cylinder. This shaft is also provided with the journal-bearing 43 and is driven from the crank-shaft by a geared connection, as indicated by dotted lines at 44, Fig. 1.

The lower ends of the air and exhaust valve stems have a threaded engagement, as shown in Figs. 3, 4, and 7, with a cap-plate 45, resting on the outer end of a link or links 46, the opposite inner end of these links being pivoted, as at 47, to a convenient part of the cylinder-casting. A roller $a^3$ is journaled in the outer ends of the link or links 46 and has a rolling frictional contact with a cam or cams 48, rigidly mounted on cam-shaft 40. The cams are properly set with reference to the air and exhaust valves and are arranged in pairs at each end of the cylinder and act to open and close the valves alternately at the proper time with reference to each other.

It will be noted in Fig. 3 that the exhaust-valve is closed, the low part of its cam being in contact with the connection between it and the valve-stem. At this time the air-valve, Fig. 4, is open and the lifting high part of the cam in contact.

The threaded connection of the cap-plates with the lower end of the different valve-stems allows for the lengthening or shortening of the same, which feature, together with the actuating-cams, provides for a nicety of adjustment in timing the movement of the valves with reference to each other in securing the best results possible.

One of the essential features of this invention is to so set and time the movement of the exhaust-valves that they will not reach their full closing position and remain partially open until the piston shall have started on the return stroke, so that a portion of the previously-exploded charge will not be exhausted, but remain to mix with and heat the fresh incoming charge for the next explosion. The reason for this is that a portion of the mixture lying at the farthest distance from the initial point of ignition is not thoroughly consumed, and as this will naturally be the last to escape through the exhaust a part of it can be retained and remixed, thus obtaining an economical consumption and a saving in gas. This result is effected by using the valve-chests as a remixing-chamber for that portion of the exploded charge retained and the new incoming explosive charge. The valve-chest chamber or chambers $a^4$, as more particularly shown in Fig. 9, are of considerable area and inclosed by a semicircular or rounded wall $a^5$, which facilitates the process of reuniting the portion retained and the incoming charge. By having the walls circular the circulation of the gaseous admixture meets with less resistance and moves more freely with a whirling action than if the inclosing walls had straight sides.

It will be understood that the air is drawn into passage 31 at all times by the action of the piston from either end. The gas is taken in and mingled with the volume of air in such quantities as the service of the engine requires and which is automatically regulated by the governor apparatus. In practical working it is found that a residuum, as expressed by heat units, remains in the cylinder after each explosion.

The springs 49 serve to retain the air and exhaust valves in their normally closed position. The companion valve-casings 50 are secured to the respective air-valve chests and communicate with the interior thereof through a straight passage 51 in the casing, leading from the ignition-tubes 52, as shown in Fig. 7. The timing-valves 53 are formed on the upper ends of valve-stems 54 and traverse the passage 51 in the operation of alternately opening and closing the same.

The gas for heating the ignition-tubes is supplied through a pipe 56, the passage therethrough being controlled by a cock $a^6$, Fig. 8. The gas is conducted into a tubular ring H', Figs. 10 and 11, which surrounds the base of the ignition-tubes, as shown in Fig. 8. This ring is provided with a number of burners $b'$, disposed at intervals and inclining inwardly. The necessary volume of air for the promotion of combustion is admitted through apertures $b^2$. This mechanism and arrangement thereof provide for a thorough mixing of the elements of combustion and produce an intense flame.

The lower ends of the timing-valve stems 54 are threaded in a cap-plate 57, which rests on the ends of pivoted links 58, like those of the air and exhaust valves, and have rollers 59 journaled in the outer ends thereof, which have contact with companion cams 60, mounted on the cam-shaft.

The funnels or tubes 61 inclose the ignition-tube. By removing plug 62 the straight passage leading from the ignition-tubes into the valve-chests may be conveniently cleared in case of clogging, and by removing plug 63 the ignition-tubes may also be cleaned with facility, which is an important consideration in this class of devices.

The combined governor and supply regulator 35 is preferably located at the center of the cylinder and midway between the timing-valves. The governor-valve casing 64 is rigidly secured to the cylinder and has the gas-opening 65 therethrough in line with the air-passage leading to the air-valves, the gas-supply being received through a cock 66. The passage 67, leading from the governor into the cylinder, is normally closed by a check-valve 68. This valve is returned to and held in its closed position by a spring 69, Figs. 12 and 14, and opened for the admission of the gas by the suction of the piston. This valve serves the purpose of preventing the gas from accidentally escaping through the air-passages in the pedestal when the engine is at rest and the supply-cock 66 left open.

The equilibrium or governor valve 70 is inserted loosely in place, Fig. 12, and is separated from the inclosing wall of the casing by a lining 71, between which lining and the wall is an annular space 72. The said lining has a number of ports 73 cut therethrough on opposite sides and opening into the annular space 72 and are separated from each other by a web 74, extending into the annular space and running the whole length vertically of the valve, thus completely separating the suction from the supply side, as shown in sectional plan, Fig. 14.

The lining 71 is provided on the bottom with an annular inwardly-projecting lip 75, on which valve 70 rests when in its normal position. This lining is retained in place by a cap 76. The valve 70 is cylindrical in cross-section and is made hollow, so as to provide an annular chamber 77. The exterior shell of the valve is provided with ports corresponding with the ports in the surrounding lining. The inner shell of the governor-valve is provided with an annular shoulder 78, which fits loosely into an annular recess 79, formed by a shoulder 80 on sleeve 81 and a nut 82, having a threaded engagement with the lower end of said sleeve. This arrangement prevents a vertical movement of the governor-valve independently of the sleeve 81. It will be noted that when the governor-valve is in its normal position it does not have contact with either the shoulder or the sleeve or the nut 82, being supported on the lip 75, formed on the lining surrounding the valve. This leaves a clear space between the governor-valve and sleeve 81 for the purpose of affording proper lubrication. The groove 83 in cap 76 forms an oil-receptacle, from which it will work down between the sleeve and cap and reach the governor-valve and parts needing lubrication. The upward movement of the governor-valve is limited by its contact with cap 76. This valve is prevented from having a rotary movement by companion lugs 84, Figs. 12 and 13, formed opposite each other on the lower end and interior of lining 71 and projecting through an opening g, Fig. 13, in the governor-valve. This provides for the ports in the valve and lining always being in line.

The sleeve 81 is feathered to the governor-spindle 85, as at 86, so as to provide for both a rotary and longitudinal movement with reference to said spindle. The lower end of the sleeve rests on a collar 87, formed on the governor-spindle, the upper end being provided with two lugs 88, to which are pivoted arms 89, supporting governor-balls 90 on their outer ends. The spindle 85 is recessed for the insertion and bearing of the inner downwardly-curved ends 91 of the governor-arms, which provides for a vertical movement of the sleeve and a corresponding up-and-down movement of the governor-valve as the balls move inwardly or outwardly in accordance with the speed of the engine. As the valve rises it diminishes the area of the gas-admission ports, and the movement in the opposite direction increases the area. Thus the volume of gas is regulated to a nicety in accordance with the variable requirements of the working capacity of the engine. This form of governor-valve is very sensitive and instantly responds to the least possible variation in speed or the demand for more or less power. It will be noted that this equilibrium gas-valve is in perfect balance during the working of the engine. This valve by its operation diminishes or increases the area of the port-openings, as may be required; so it will be readily understood that in regulating the admission of gas it also controls the force of the explosion.

The collar 87 forms a bearing for the governor-spindle in the valve-casing. A pinion 92 is mounted on the lower end of spindle 95, which engages with a gear-wheel 93, mounted on the cam-shaft, as shown in Fig. 1 and indicated by dotted lines in Fig. 12, by which means the required motion is transmitted to the governor apparatus.

The operation is as follows: The explosive charge is admitted on the outstroke behind the piston to the back compression-chamber through the gas and air valves. These valves close at the proper time, and on the return stroke the mixture is compressed in the chamber or space in the end of the cylinder and is then ignited at the proper time by the action of the timing-valve, which admits the explosive agent, and an impulse given to the back end of the piston. On the return stroke the burned gases are forced out through the exhaust. It will be remembered that the exhaust-valve does not entirely close until the piston has traveled part way of the charging stroke, so that a portion of the exploded charge is retained, as before described. This being a double-acting engine, the same operation takes place in the opposite end of the cylinder, and the forward impulse is succeeded by a backward impulse, or vice versa, so that during one revolution of the engine two impulses are given to the crank-shaft, the energy of which is stored in the fly-wheel. During the succeeding revolution of the engine the operation of charging and discharging continues, so that every second revolution two impulses are given, to be followed by one revolution of two idle strokes so far as the evolution of power is concerned.

Having thus described my invention, what I claim as new, and desire to secure by Letters Patent, is—

1. In a gas-engine, a mixing-chamber, located under the longitudinal center of the cylinder, the air and gas supply passage, leading to the inlet-valve, the exhaust-passage, common to both the inlet and exhaust valves, leading into the cylinder; the movement of the exhaust-valves being so adjusted as not to reach their full closing position until the piston has started on the return stroke and thereby retain a portion of the last-exploded charge in the valve-chest to mingle with the next incoming explosive charge, substantially as described.

2. In a gas-engine, the air and gas supply passage leading to both ends of the cylinder and opening centrally to external air, the gas-supply passage controlled by the governor and leading to the central part of the air and gas supply passage, the inlet-valve controlling the inflow of fresh mixture, and the exhaust-valve controlling the outflow to the exhaust-passage and permitting the immediate return of a portion of the exploded charge to mingle with the new charge, and means for operating said valves.

3. In a gas-engine, the double-acting cylinder, the semicircular valve-chests, located at each end of the cylinder and on the same side, the air and exhaust valves, seated in said valve-chests, the semicircular mixing-chamber, above the seat of said valves and communicating directly with the space ends of the cylinder, whereby the air, gas, the portion of gases retained and the heat from the last explosion are all united into a homogeneous mixture while being drawn into the cylinder as an explosive charge, the mixing-chambers at all times being open to the compression-space of the cylinder and forming a part thereof without any intercepting valves.

4. In a gas-engine, a double-acting cylinder, the companion circular valve-chests, located at each end of the cylinder on the same side, the inlet and exhaust valves, the circular-walled mixing-chamber, above the seat of said valves and opening directly into the compression-space in the respective ends of the cylinder, and means for controlling the movement of the exhaust-valves and holding them partially open until after the piston has moved on its return stroke, substantially as described.

5. In a gas-engine, the combination with the engine-cylinder, of a supporting-pedestal, an air-chamber and an exhaust-silencing chamber, located in said pedestal and separated by a partition, the passages leading to the air-valves, the exhaust-passages, opening into the silencing-chamber, and means for varying the area of the atmospheric-air-admission opening into said pedestal, substantially as described.

6. In a gas-engine, the gas-supply passage and the governor controlling the same, the air and gas passage with which said gas-passage communicates through a check-valve, said air and gas passage leading to both ends of the cylinder, the inlet-valve and the exhaust-valve at each end of the cylinder and a common passage leading from said valves to the cylinder at each end, and means for opening the inlet-valve, and retaining open the exhaust-valve for a partial return of vapors from the exhaust-passage, all combined substantially as described.

In testimony whereof I affix my signature in presence of two witnesses.

HENRIK C. STRÄNG.

Witnesses:
L. M. FREEMAN,
L. B. COUPLAND.